M. SEITZ.

BEER-CASKS.

No. 7,297.

Reissued Sept. 5, 1876.

WITNESSES.

Max Brill

Wm. J. Hosea

Michael Seitz

INVENTOR.

N. PETERS, PHOTO-LITHOGRAPHER, WASHINGTON, D. C.

UNITED STATES PATENT OFFICE.

MICHAEL SEITZ, OF BROOKLYN, E. D., NEW YORK.

IMPROVEMENT IN BEER-CASKS.

Specification forming part of Letters Patent No. 139,334, dated May 27, 1873; reissue No. 7,297, dated September 5, 1876; application filed February 19, 1876.

*To all whom it may concern:*

Figure 1:
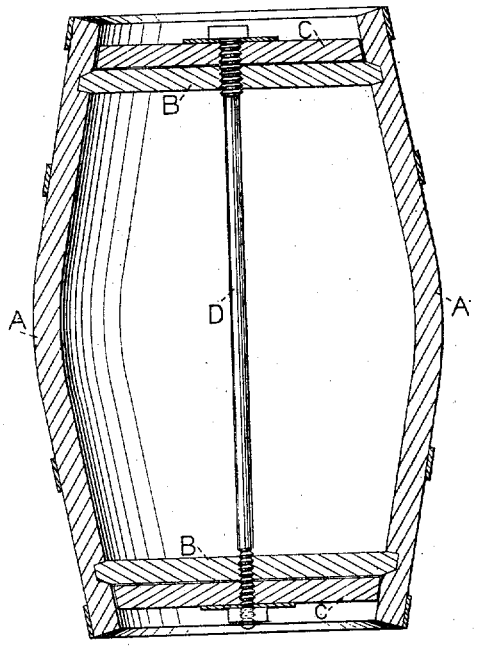
Figure 2:
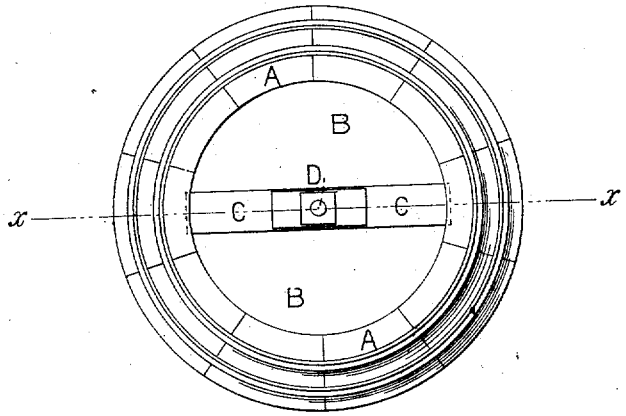

Be it known that I, MICHAEL SEITZ, of Brooklyn, E. D., in the county of Kings and State of New York, have invented a new and useful Improvement in Beer-Casks, of which the following is a specification:

Figure 1 is a longitudinal section of a beer-cask to which my improvement has been applied, and Fig. 2 is an end view of the same. Similar letters indicate corresponding parts.

My invention has for its object to prevent the heads of large beer-casks or tuns from being stretched or sprung outward by the pressure of the beer in working, and thus prevent the consequent leakage and loss; and the invention consists in the combination of an iron or metal stay-rod with the heads of the cask by means of screw-threads, so that the tensile strength of the rod will sustain the heads from bulging outward, as will hereinafter appear.

At A is represented the staves of a beer-cak or tun, and at B are shown the heads inserted in the ordinary way. At C are shown bars placed across the exterior of the heads B. D is a rod, extending longitudinally through the center of the cask A B, and is provided with a head on one end, and a nut on the other, as shown in the drawings.

The holes in the heads are made a little smaller than the part of the rod that passes through them, and upon the end parts of the said rod, and for a distance equal to the thickness of the heads B and bars C, are cut screw-threads of the same pitch, and running in the same direction, so that the rod may be screwed into both heads at the same time, by which construction the threads, sinking into the wood of the heads, will prevent the beer from leaking out around the rod D. The head and nut of the rod D have washers interposed between them and the bars C, to prevent the bars from being worn by the head and nut.

Having thus described my invention, I claim—

1. In combination with a beer-cask, a longitudinal stay-rod, provided with screws at each end, to support the heads of the cask and prevent them from bulging out, substantially as described.

2. The combination of the stay-rod, having a head upon one end and a nut upon the other end, and screw-threads of the same pitch, and running in the same direction upon both ends with the heads of the cask A B, substantially as shown and described.

MICHAEL SEITZ.

Attest:

MAX BRILL,

WM. G. HOSEA.